(12) United States Patent
Ebert (10) Patent No.: US 12,466,136 B2
(45) Date of Patent: Nov. 11, 2025

(54) MANUFACTURING METHOD FOR A DENTAL OBJECT

(71) Applicant: Ivoclar Vivadent AG, Schaan (LI)

(72) Inventor: Jörg Ebert, Buchs (CH)

(73) Assignee: Ivoclar Vivadent AG, Schaan (LI)

( * ) Notice: Subject to any disclaimer, the term of this patent is extended or adjusted under 35 U.S.C. 154(b) by 137 days.

(21) Appl. No.: 18/179,181

(22) Filed: Mar. 6, 2023

(65) Prior Publication Data
US 2023/0286220 A1 Sep. 14, 2023

(30) Foreign Application Priority Data
Mar. 8, 2022 (EP) .................................. 22160815

(51) Int. Cl.
| | |
|---|---|
| *B29C 64/40* | (2017.01) |
| *A61C 13/00* | (2006.01) |
| *B33Y 10/00* | (2015.01) |
| *B33Y 80/00* | (2015.01) |

(52) U.S. Cl.
CPC .......... *B29C 64/40* (2017.08); *A61C 13/0019* (2013.01); *B33Y 10/00* (2014.12); *B33Y 80/00* (2014.12); *A61C 13/0013* (2013.01)

(58) Field of Classification Search
CPC .............................................. A61C 13/0019
See application file for complete search history.

(56) References Cited

U.S. PATENT DOCUMENTS

| | | | | |
|---|---|---|---|---|
| 7,665,956 B2 * | 2/2010 | Mitchell | ................. | F01D 5/182 |
| | | | | 415/115 |
| 10,315,247 B2 * | 6/2019 | Mark | ...................... | B22F 10/22 |
| 11,584,084 B2 | 2/2023 | Miller | | |
| 2009/0274549 A1 * | 11/2009 | Mitchell | ................. | F01D 5/186 |
| | | | | 415/115 |
| 2017/0087632 A1 * | 3/2017 | Mark | ................... | B22D 27/003 |
| 2021/0001568 A1 | 1/2021 | Hoyle et al. | | |
| 2021/0228316 A1 * | 7/2021 | Korten | ................. | B29C 64/135 |
| 2022/0312902 A1 | 10/2022 | Oumnia | | |

FOREIGN PATENT DOCUMENTS

| | | |
|---|---|---|
| CN | 112706407 A | 4/2021 |
| DE | 102015011110 A1 | 2/2016 |

\* cited by examiner

*Primary Examiner* — Xiao S Zhao
*Assistant Examiner* — Nicholas J Chidiac
(74) *Attorney, Agent, or Firm* — Ann M. Knab; Thad McMurray (57) ABSTRACT

A manufacturing method for a dental object (100) including the steps of generating a dendritic base structure (101) on a build platform (103) and building the dental object (100) on the dendritic base structure (103) by a three-dimensional printing method.

12 Claims, 9 Drawing Sheets

MANUFACTURING METHOD FOR A DENTAL OBJECT

CROSS-REFERENCE TO RELATED APPLICATIONS

This application claims priority to European patent application No. 22160815.1 filed on Mar. 8, 2022, which disclosure is incorporated herein by reference in its entirety.

TECHNICAL FIELD

The present invention relates to a manufacturing method for a dental object, a dendritic base structure for building a dental object by a three-dimensional printing method, and a dental object manufactured by the manufacturing method.

BACKGROUND

In three-dimensional printing processes, the object to be produced must be connected to the printer in a suitable manner. Regularly this connection is established on a build platform of the printer. The adhesion at the interface between the build platform and the object ensures the positional accuracy of the object within the build space in the further printing process.

In stereolithography, however, there are processes in which the object is subjected to forces during production that are also transferred to the interface between the build platform and the object. For a fast and safe process, these forces must be kept as low as possible. Current base structures are disadvantageous for ensuring adhesion of the object to a build platform with respect to fluid-specific process forces. A polymerized surface of a base structure represents at the same time an adhesion enhancing surface but also a barrier for the free flow of material.

Examples of three-dimensional printing methods and or computer-aided calculations are set forth in U.S. Pat. No. 11,584,084 20220312902, 20210001568 and 20210228316, which are hereby incorporated by reference in their entirety.

SUMMARY

It is the technical aim of the invention to ensure efficient transfer of forces from a dental object to a build platform of a printer and to enable efficient removal of uncured manufacturing material.

This technical problem is solved by subject-matter according to the independent claims. Technically advantageous embodiments are the subject of the dependent claims, the description and the drawings.

According to a first aspect, the technical problem is solved by a manufacturing method for a dental object, comprising the steps of generating a dendritic base structure on a build platform; and building the dental object on the dendritic base structure by a three-dimensional printing process. The dendritic base structure provides the technical advantage of efficiently transferring forces from the dental object to the build platform and preventing damage to the structures built thereon. The dendritic base structure ensures a connection between the build platform and further support structures, while good adhesion, material flow and low process forces are achieved. After partial curing of the manufacturing material, there is uncured manufacturing material between the branches and twigs and the other structures of the base structure. This manufacturing material should be removed in the further manufacturing process. Due to the open dendritic base structure, the technical advantage is achieved that the uncured, liquid manufacturing material can quickly flow out of the interstices and the manufacturing of the dental object is accelerated. A good material flow is characterized by a faster pressure equalization when separating and feeding the build platform by the manufacturing material flowing in or pressed out along the polymerized structure.

In a technically advantageous embodiment of the manufacturing method, the dendritic base structure has a main structure from which extensions extend in outward direction. The extensions can extend outward in a star shape. This has the technical advantage, for example, that a good force distribution is achieved in all directions.

In another technically advantageous embodiment of the manufacturing method, the main structure of the dendritic base structure is located below the geometric center of the dental object. This achieves, for example, the technical advantage that forces from the dental object are distributed evenly to the base structure.

In another technically advantageous embodiment of the manufacturing method, a twig of the dendritic base structure is formed with a smaller width than a branch of the dendritic base structure. This achieves, for example, the technical advantage of transmitting forces to outer regions with a small amount of material.

In another technically advantageous embodiment of the manufacturing method, support structures for the dental object are generated on the base structure. This achieves the technical advantage, for example, that forces can be efficiently transferred from the dental object to the base structure.

In another technically advantageous embodiment of the manufacturing method, at least one support structure is formed beyond the dendritic base structure. This achieves, for example, the technical advantage that dental objects with a large span can be produced with a low material input.

In another technically advantageous embodiment of the manufacturing method, the dendritic base structure is mirror-symmetric, rotationally symmetric or asymmetric. An asymmetric base structure can be optimally adapted to the dental object. Regularly freely shaped dental objects result in asymmetrical base structures. This has the technical advantage, for example, of achieving uniform force transmission.

In another technically advantageous embodiment of the manufacturing method, the main structure of the dendritic base structure is arranged below the center of gravity of the dental object to be built up. This achieves, for example, the technical advantage that the dental object can be supported uniformly.

In another technically advantageous embodiment of the manufacturing method, the center of gravity of the dental object is supported by a support structure on the main structure of the dendritic base structure. This achieves, for example, the technical advantage of further improving the stability of the structure.

In another technically advantageous embodiment of the manufacturing method, a dendritic support structure is built onto the dendritic base structure. This achieves, for example, the technical advantage that the support structure can efficiently transfer forces to the base structure.

In another technically advantageous embodiment of the manufacturing method, a local width of the dendritic base structure is adapted to the locally occurring forces by the dental object. This achieves, for example, the technical advantage that the dendritic base structure can transfer forces to the build platform with a low material input.

In another technically advantageous embodiment of the manufacturing method, the dendritic base structure is built up in layers. This achieves, for example, the technical advantage that the dendritic base structure can be easily manufactured to a desired thickness.

In another technically advantageous embodiment of the manufacturing method, a height of the dendritic base structure increases towards the main structure of the dendritic base structure. The lowest designed parts of the base structure have a height according to a number of cured layers. An increase of a height from the outside to the inside may be, for example, 3 (twig) to 6 (branch) to 9 (main structure) or 3 (twig) to 10 (branch) to 20 (main structure). This achieves, for example, the technical advantage that the mechanical strength of the dendritic base structure is adapted to the forces that occur and a material flow is further facilitated.

In another technically advantageous embodiment of the manufacturing method, several dendritic base structures are created on the build platform. This achieves, for example, the technical advantage that the dental object can be supported over a large width or span.

According to a second aspect, the technical problem is solved by a dendritic base structure for building a dental object by a three-dimensional printing process. Thereby, the same technical advantage is solved as by the manufacturing method according to the first aspect.

According to a third aspect, the technical problem is solved by a dental object manufactured by a manufacturing method according to the first aspect. Thereby, the same technical advantage is achieved as by the manufacturing method according to the first aspect.

BRIEF DESCRIPTION OF THE DRAWINGS

Examples of embodiments of the invention are shown in the drawings and are described in more detail below.

DETAILED DESCRIPTION

Figure 1A:
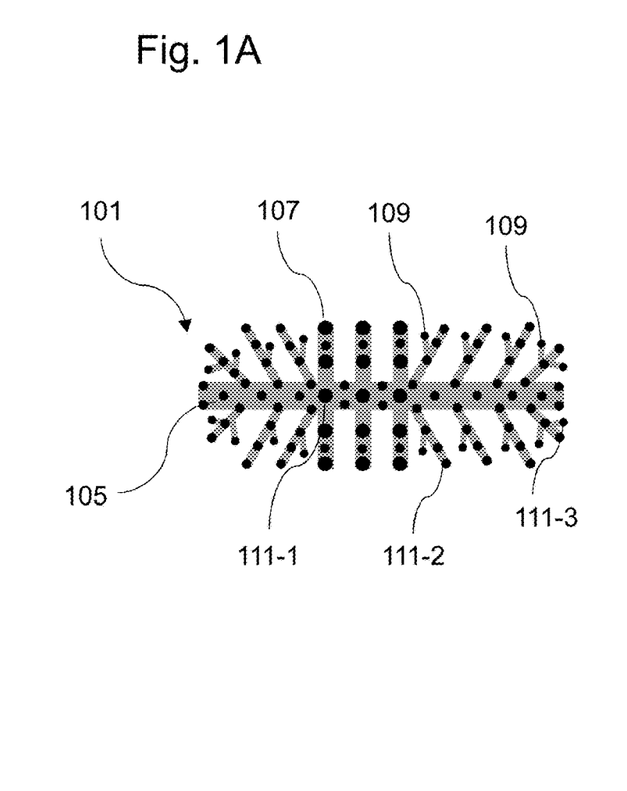
FIG. 1A shows a top view of a dendritic base structure.
Figure 1B:
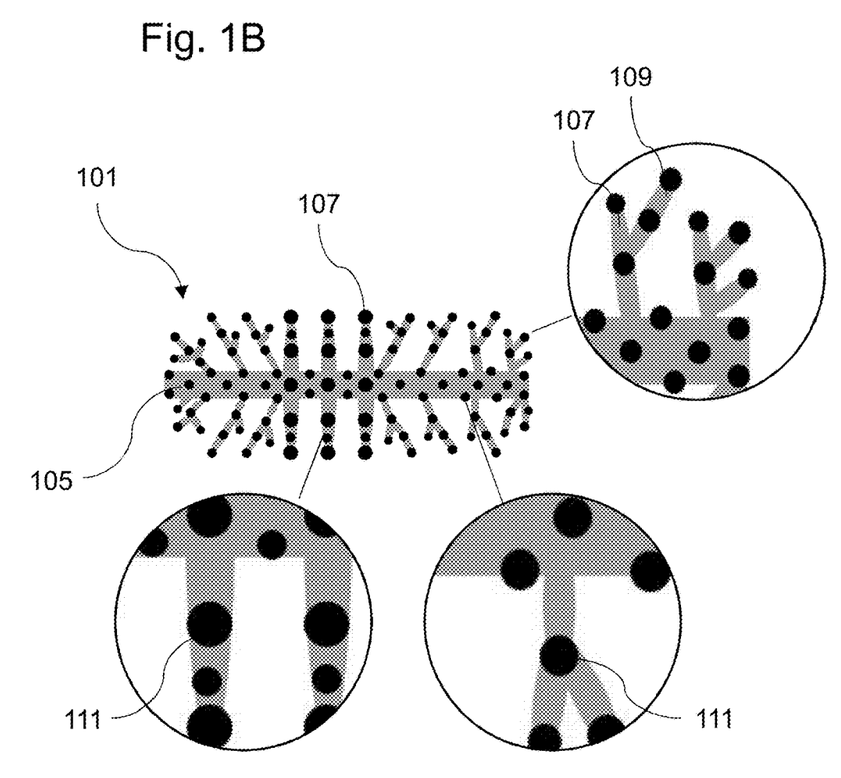
FIG. 1B shows a top view of a dendritic base structure.

FIGS. 1A and 1B show top views of different dendritic base structures 101. The dendritic base structures 101 are generated by the first layers of a build job for a three-dimensional dental object 100 (FIG. 3) in a three-dimensional printing process. The dendritic base structures 101 may be generated on a build platform 103 (FIG. 3) of the printer by a computer-aided calculation method with corresponding calculation rules.

A dendritic base structure 101 has a planar main structure 105 from which extensions extend in outward direction. The mutual spacing of the extensions may increase outwardly. The width of the extensions may decrease outwardly. The dendritic base structure 101 may include branches 107 as extensions and twigs 109 as further extensions. In this regard, a twig 109 branches off from a branch 107. This twig 109 may then in turn form a new branch for another twig.

FIG. 1A shows a base structure 101 with branches 107 and twigs 109. Support structures 111-1, 111-2 and 111-3 are arranged on this base structure 101 with a geometry corresponding to the force-transmitting function. The support structures 111-1, 111-2 and 111-3 support the dental object 100 on the base structure 101. For this purpose, these provide a mechanical connection between the base structure 101 and the dental object 100. The support structures 111-1, 111-2 and 111-3 can be attached to the dental object 100 with hemispherical or cylindrical structures (support heads).

FIG. 1B shows an embodiment with geometrically reduced base structure 101. The extensions may connect the base of two or more support structures 111-1, 111-2, and 111-3 or bridge the shortest path to adjacent dendrites.

Figure 2A:
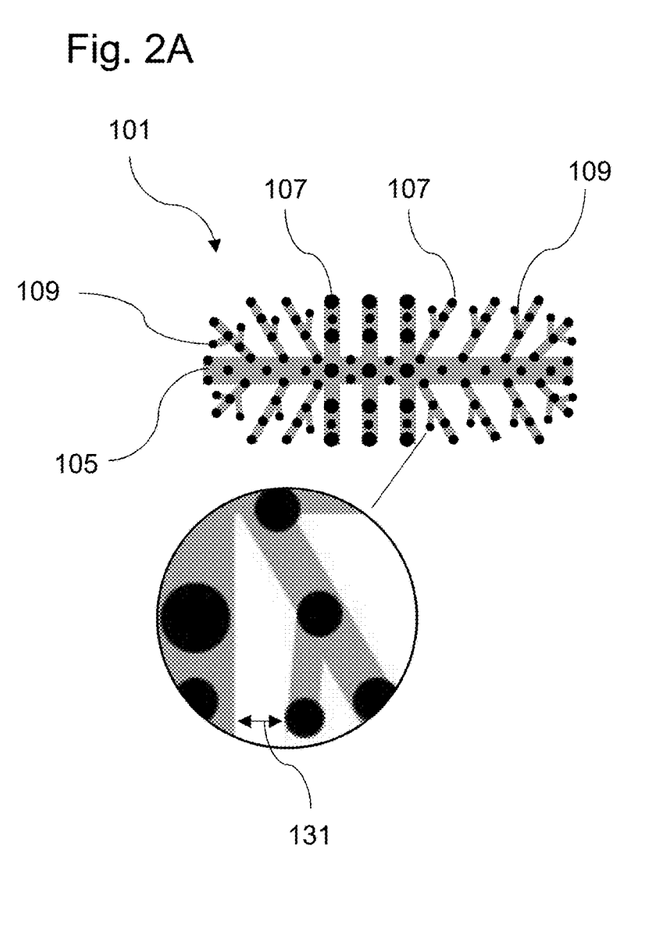
FIG. 2A shows a top view of a dendritic base structure.
Figure 2B:
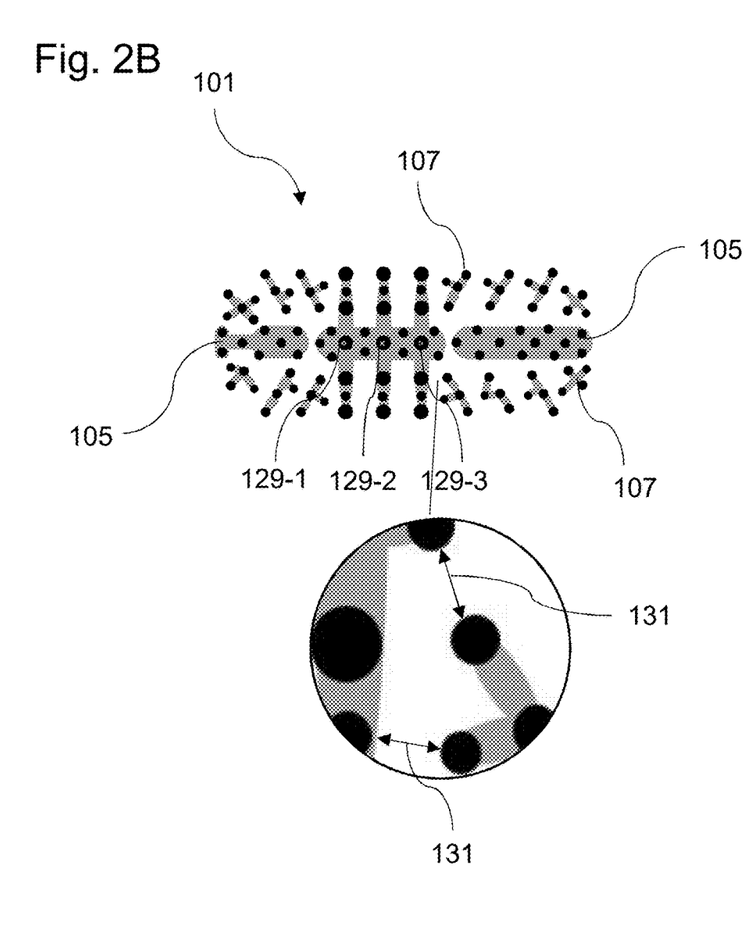
FIG. 2B shows a top view of a dendritic base structure.

FIGS. 2A and 2B show further top views of different dendritic base structures 101. FIG. 2A shows a constriction 131 existing between two extensions. The uncured manufacturing material can only flow through this constriction 131 with inhibited material flow. FIG. 2B shows an optimized base structure 101, with points 129-1, 129-2, and 129-3 being the center of the base structure 101 at different times. The base structure 101 is selectively opened and follows a projection of the line of layer-specific centroids of plane areas. The multi-centers of the base structure 101 each have a suitable wall thickness.

Figure 3:
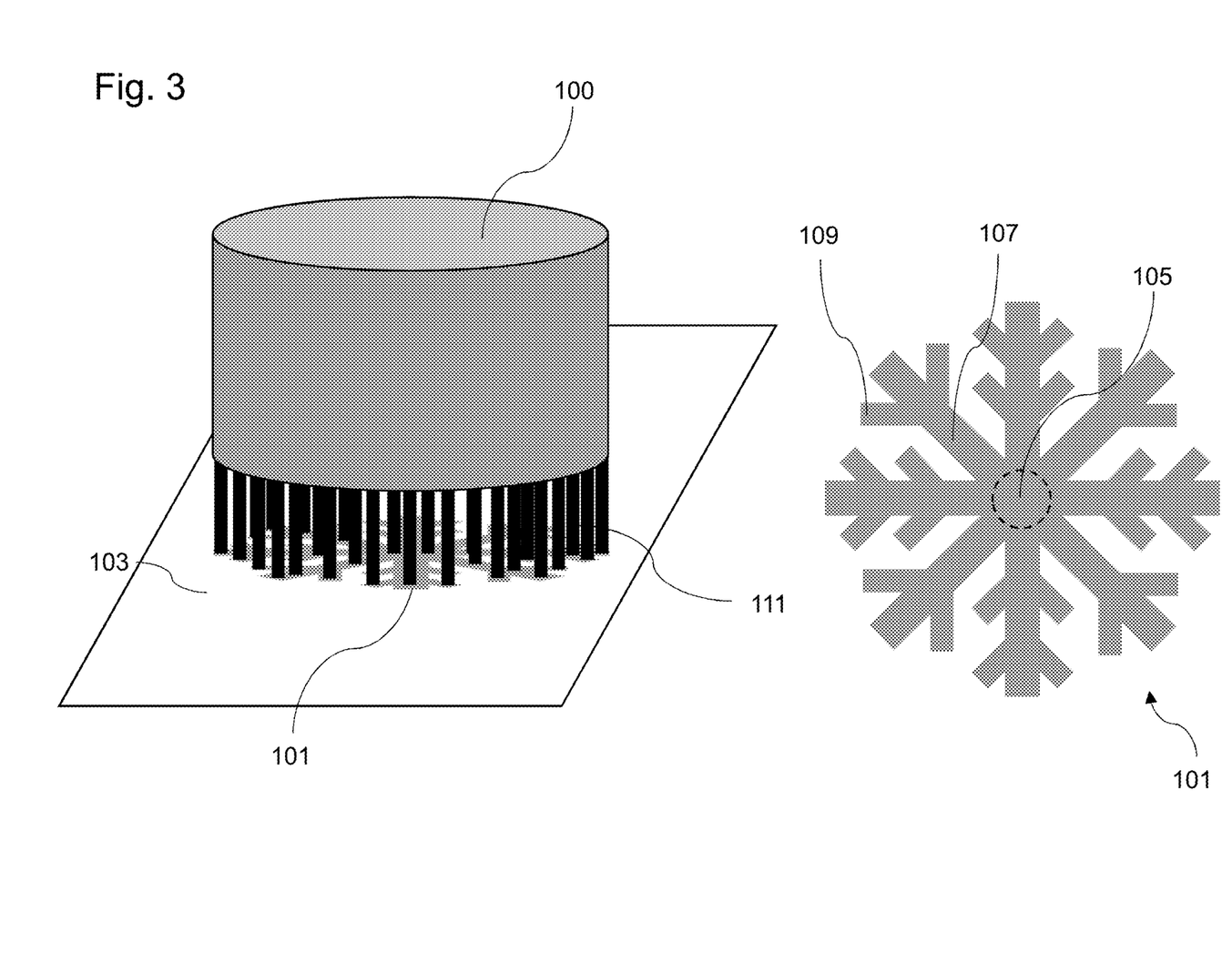
FIG. 3 shows a perspective view of a dental object that has been built on the base structure.

FIG. 3 shows a perspective view of the dental object 100 built on the dendritic base structure 101. For example, the dental object 100 is a crown, bridge, veneer, abutment, inlay, onlay, splint, or partial or full denture. In general, the dental object 100 may be any object in the dental field that is to be produced by a three-dimensional printing process.

During the manufacture of the dental object 100, first the dendritic base structure 101 is built up layer by layer on the planar build platform 103 of the printer. With a number of, for example, ten layers with a height of 50 µm, a dendritic base structure 101 with a height of 500 µm is created in total before a free material flow of the liquid manufacturing material through the higher-level support structures (support structures) 111 can take place.

The dendritic base structure 101 is used to transfer forces to the build platform 103 during manufacturing. The dendritic base structure 101 adheres to the build platform 103 and supports the dental object 100 during the printing process. The dendritic base structure 101 is dimensioned as an adhesive surface on the build platform 103 precisely large enough to withstand the forces of the print job, but to discharge the liquid manufacturing material from the base structure 101 with minimal counterforces.

After the dendritic base structure 101 is manufactured on the build platform 103, the columnar or post-shaped support structures 111 for the dental object 100 are fabricated on the build platform 103 in layers. In general, the support structures 111 are used for further force transmission and stiffening. These follow the rules of process- and material-dependent construction options, such as a spacing to span open areas or to support spatial minima.

The support structures 111 support the dental object 100 to be produced on the dendritic base structure 101 and transfer occurring forces from the dental object 100 to the dendritic base structure 101. The support structures 111 connecting to the base structure 101 are provided, for example, at points for supporting local minima of the dental object 100. The dental object 100 is then created layer by layer on the columnar support structures 111 by the printing process.

Figure 4:
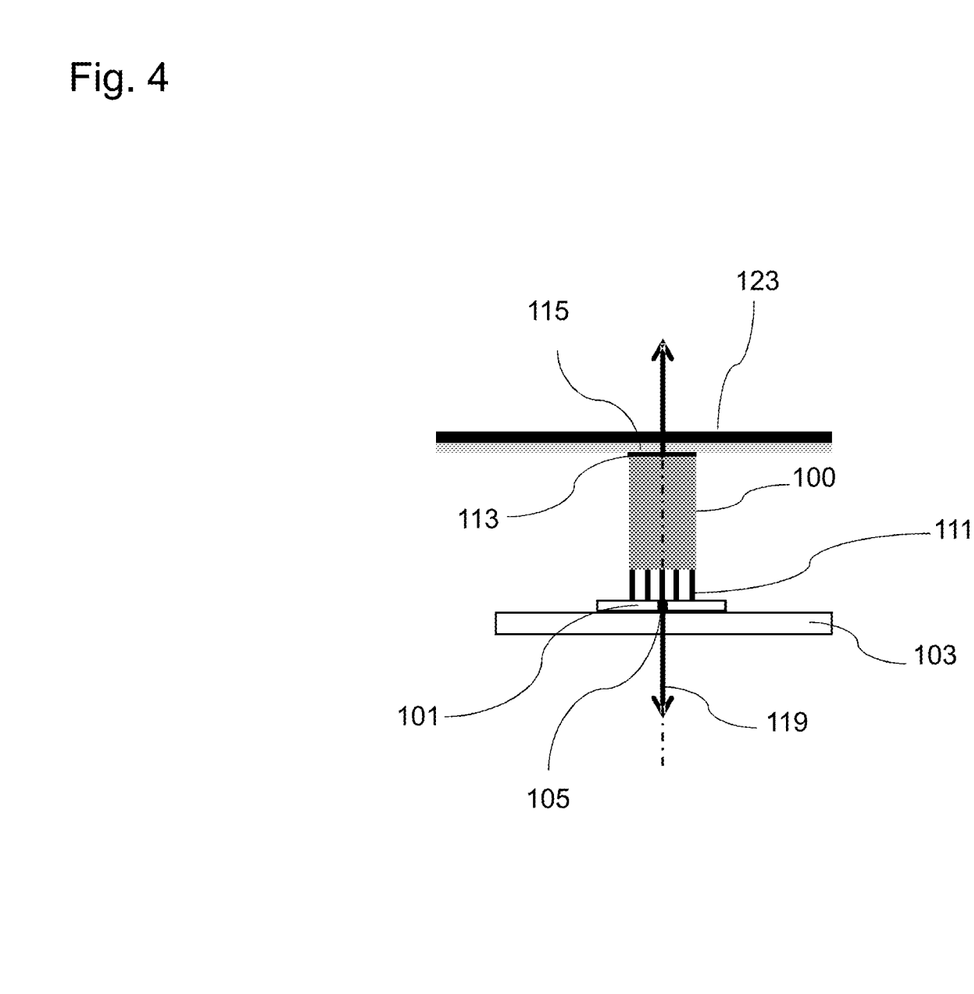
FIG. 4 shows a cross-sectional view through a dental object during manufacturing.

FIG. 4 shows a cross-sectional view through a dental object 100 during manufacturing. The angle of the center of gravity line is perpendicular to the build platform 103. Due to the separation movement of the exposure plane 123 along the vertical axis 119 in the direction of the arrow, the dendritic base structure 101 is also symmetrical in this direction.

The entire structure, including the dendritic base structure 101, the support structures 111, and the dental object 100, is built using a stereolithography process in which the manufacturing material is cured layer-by-layer by projected light patterns in an exposure plane 123.

After each step of curing a layer 113, the exposure plane 123 is separated in a separating movement and shifted a bit so that liquid manufacturing material can penetrate again and be cured in the next layer 113 at the exposure plane 123. This creates a separation plane 115 in which the built-up dental object 100 separates from the exposure plane 123. In the initial build phase, the separation forces are dominated primarily by the proximity of the build platform 103 to the exposure plane 123.

In FIG. 4, the dental object 100 is built up layer by layer from bottom to top. The exposure plane 123 is therefore arranged at the top of the dental object 100 and is gradually moved upwards (bottom-up). However, the process can also be conducted in the reverse orientation, so that the dental object 100 is built up layer by layer from the top. In this case, the exposure plane 123 is arranged on the bottom side of the dental object 100 and is gradually moved downwards (top-down).

The separation forces between the exposure plane 123 and the cured layer 113 are lower, the smaller the exposure area and the easier a free flow of the liquid manufacturing material is possible. The same applies to the infeed process, where a small cross-sectional area generates a low counter-force. A favorable geometry of the dental object 100 generates a lower flow resistance of the liquid manufacturing material, which is displaced to bring the specific area into the intended position. Within the first layers 113, the separation forces correlate with the size of the full-surface build platform 103, which has no pressure-relieving channels or structures.

The dendritic base structure 101 needs not to connect all support structures 111 to the dental object 100. Individual support structures 111 can also be freely arranged next to the dendritic base structure 101 and connected to the build platform 103. These are completely surrounded by liquid manufacturing material if it is advantageous for reasons of the geometric proportions of the dental object 100 to be manufactured.

The dendritic base structure 101, characterized by wide spacing of the of branches 107 and twigs 109 from each other, promotes sufficient flow of uncured manufacturing material. After curing there is liquid manufacturing material between the branches 107 and twigs 109 and the other structures that has not been cured. This manufacturing material should be removed in the further manufacturing method. The open dendritic base structure provides the technical advantage of allowing the uncured liquid manufacturing material to quickly drain from the interstices. This improves the manufacturing method.

In addition, a short flow path of the liquid manufacturing material to the vicinity of the intended exposure area in the exposure plane 123 is achieved. The local width or height of the branches 107 and twigs 109 of the dendritic base structure 101 is designed to accommodate the locally expected forces, which vary depending on the separation position on the build platform 103 and in relation to other dental objects 100, the centers of gravity or center of gravity shifts of the dental objects 100.

The dendritic base structure 101 has a main structure 105, such as a center, from which the star-shaped branches 107 run outward. The number of branches 107 and twigs 109 of the base structure 101 is thereby dependent on support structure based on the geometry of the dental object.

The main structure 105 of the dendritic base structure 101 may be located at the geometric center of the formed support structure 111. In this case, the lengths of the branches 107 and twigs 109 of the dendritic base structure 101 are adjusted accordingly. This applies, for example, to dental objects 100 with large spans whose center of mass is outside the dental object 100, such as ring-shaped or horseshoe-shaped dental objects 100.

Figure 5:
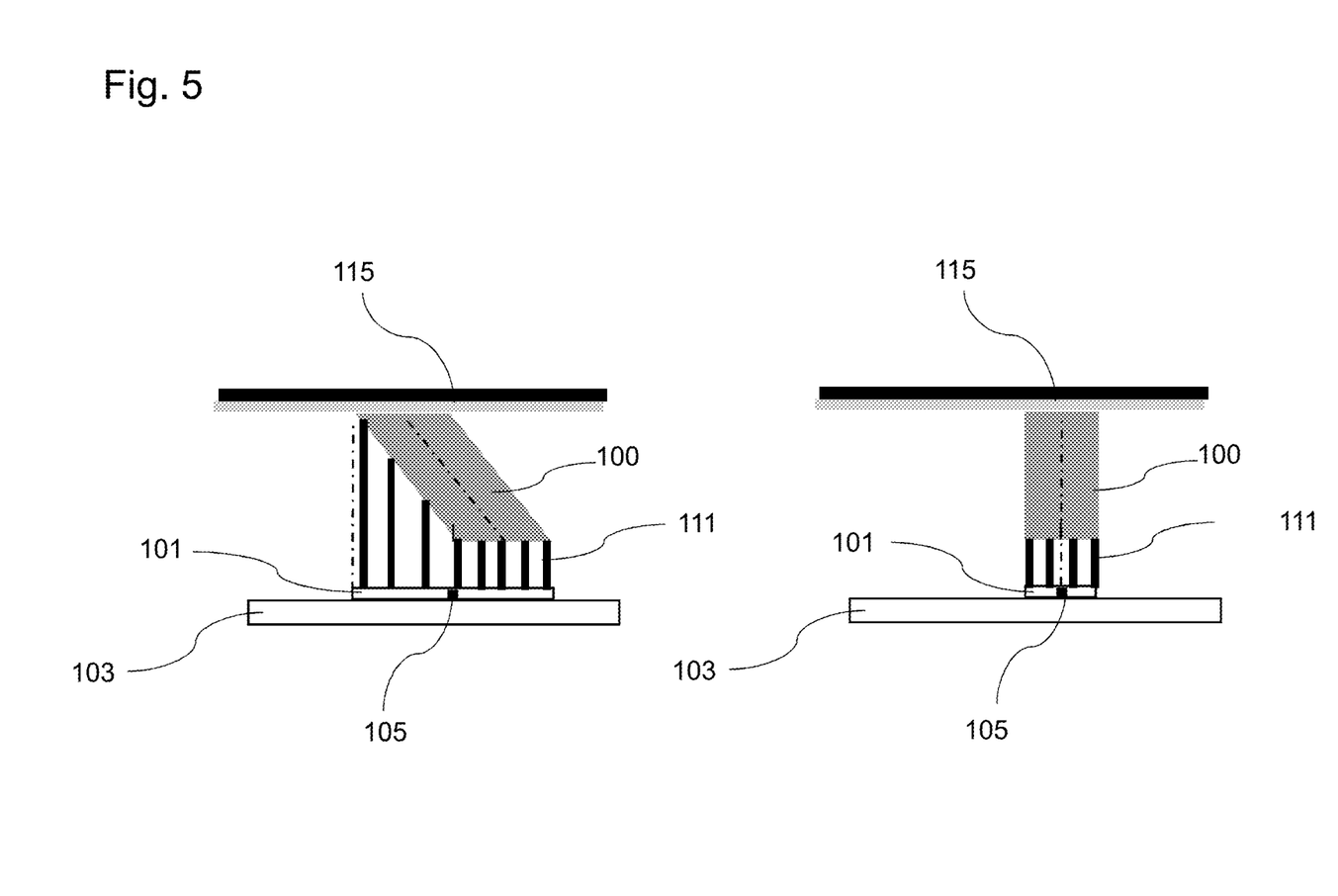
FIG. 5 shows further cross-sectional views through an inclined dental object during manufacturing.

FIG. 5 shows another cross-sectional view through an inclined dental object 100 during manufacturing in two orientations. Since the dental object 100 to be manufactured is not symmetrical in the vertical direction when projected onto the build platform 103, a shift in the center of gravity occurs with each additional layer 113 during the layer-by-layer manufacture of the dental object 100.

The main structure 105 of the base structure 101 can follow this shift in the center of gravity, so that during the construction of the dental object 100, for each newly created center of gravity in the vertical direction, there is a corresponding adhesive surface or holding point on the construction platform 103. The direction of the main structure 105 results from the sum of all centers of gravity of the respective individual layers.

In a first embodiment of the dental object (left), the main structure 105 of the dendritic base structure 101 extends in the horizontal direction. The length of the main structure 105 is calculated from the force vector acting on the interface under the given current separation conditions. If the applied force vector at the force application point changes within the separation process, this also changes the length of the main structure 105.

The force transmission between the dental object 100 and the dendritic base structure 101 is performed by the support structures 111. The design of the support structures 111 follows the same rules so that all support structures 111 are supported as a single object against acting forces.

In a second embodiment of the dental object (right), the dental object 100 is constructed symmetrically in the vertical direction. In this case, the dental object 100 can be built on a dendritic base structure extending below the dental object 100.

Figure 6:
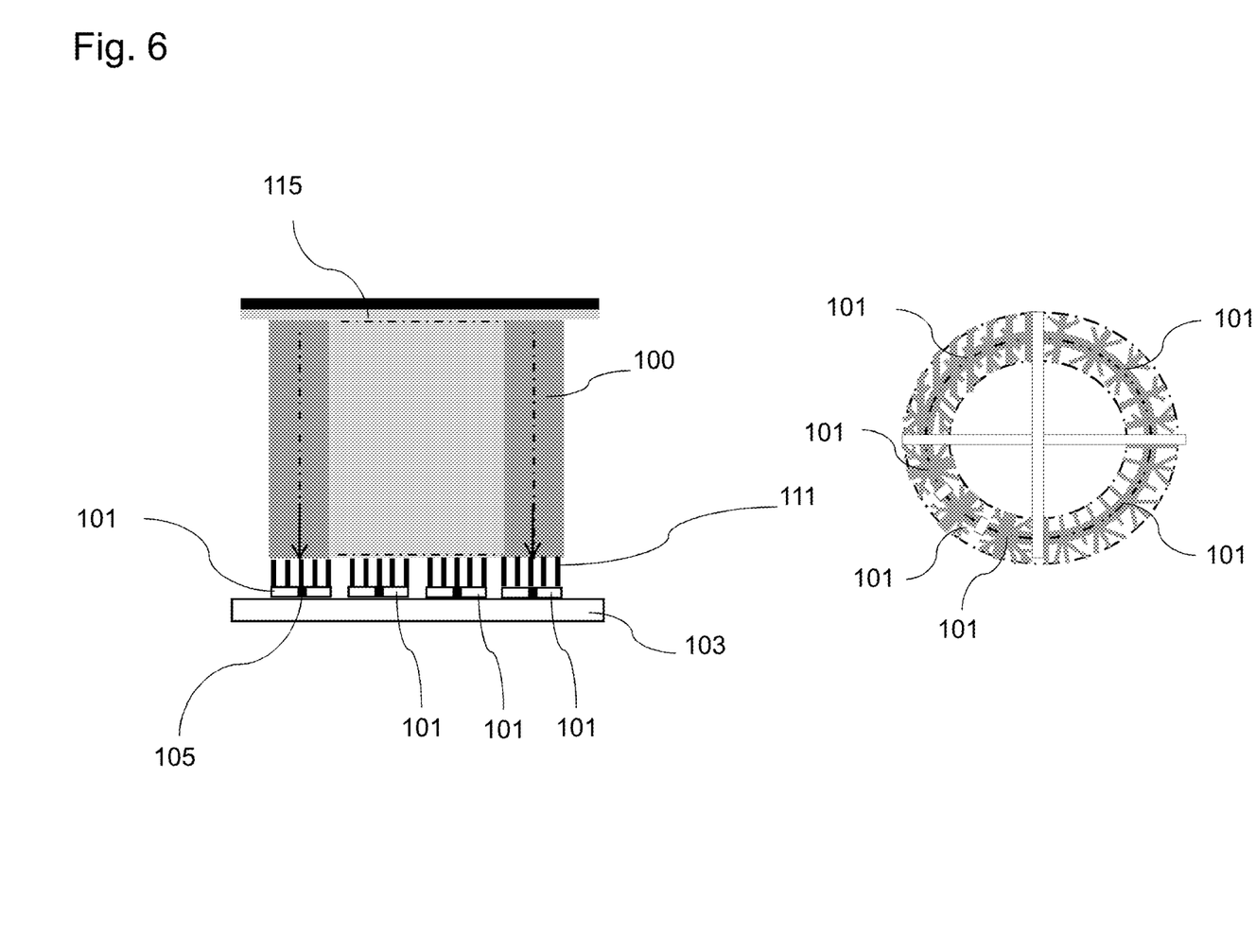
FIG. 6 shows a view of a ring-shaped dental object during manufacturing.

FIG. 6 shows another view of an annular dental object 100 having a plurality of dendritic base structures 101 during manufacturing. The dendritic base structures 101 are arranged along the lower annular surface of the dental object 100 and are formed in various embodiments of dendrite-like branching. The dendritic base structures 101 are divided into a plurality of base structures 101 for the geometry of the dental object 100.

The dental object 100 may be divided into a plurality of segments, for example 360 segments, resulting from a plane array around the normal vector in the z-direction of the center of mass of the dental object 100. The main structures 105 result from the sum of all centers of mass of the individual segments—comparable to the neutral fiber of the dental object 100. The secondary rays follow the center of mass displacement of the dental object or dental object segment. Such annular dental objects 100 have an interrupted main structure 105.

There may also be multiple main structures 105 if it is the most effective connection for the dental object 100 to be fabricated, for example, a bone-shaped dental object 100 with one main structure 105 at each end. This can further increase the flow of material, as the subdivision with multiple main structures 105 forms more ready channels that facilitate the flow of material.

Figure 7:
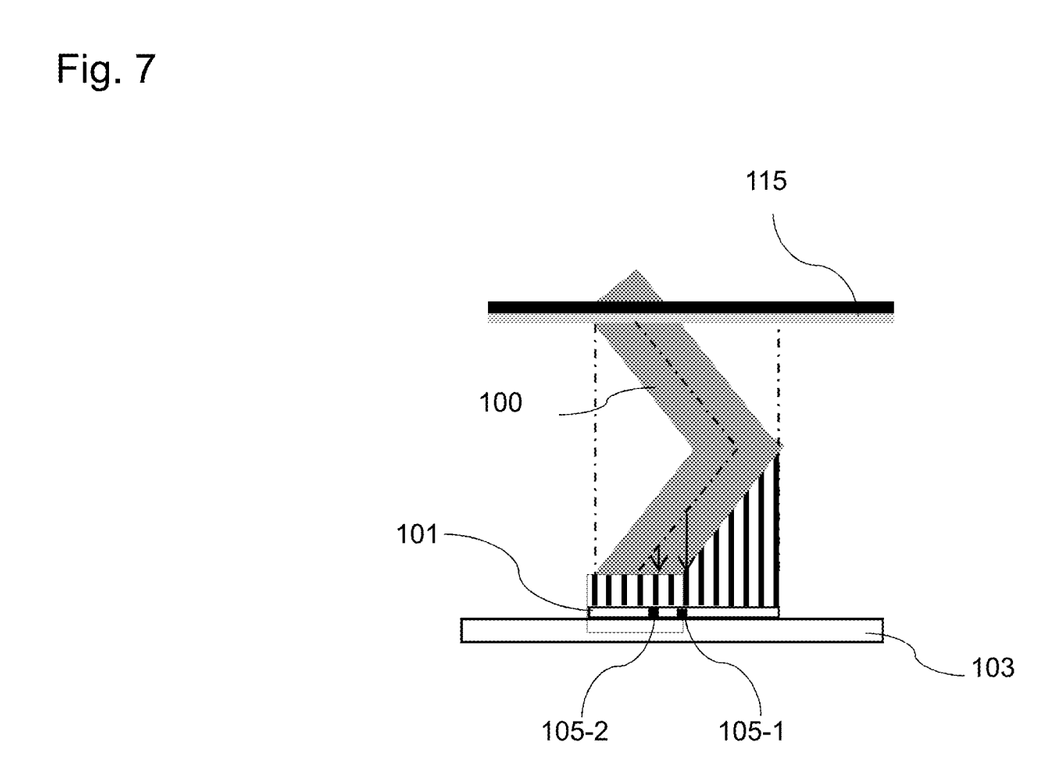
FIG. 7 shows a cross-sectional view through an angled dental object during manufacturing.

FIG. 7 shows a cross-sectional view through an angled dental object 100 during manufacturing. The laterally offset structure creates a dental object 100 with a center of gravity that varies over height. Even though there is an open structure with sufficient width, the height of a pressure equalization opening is only a fraction of the width at this early stage of the printing process.

Figure 8:
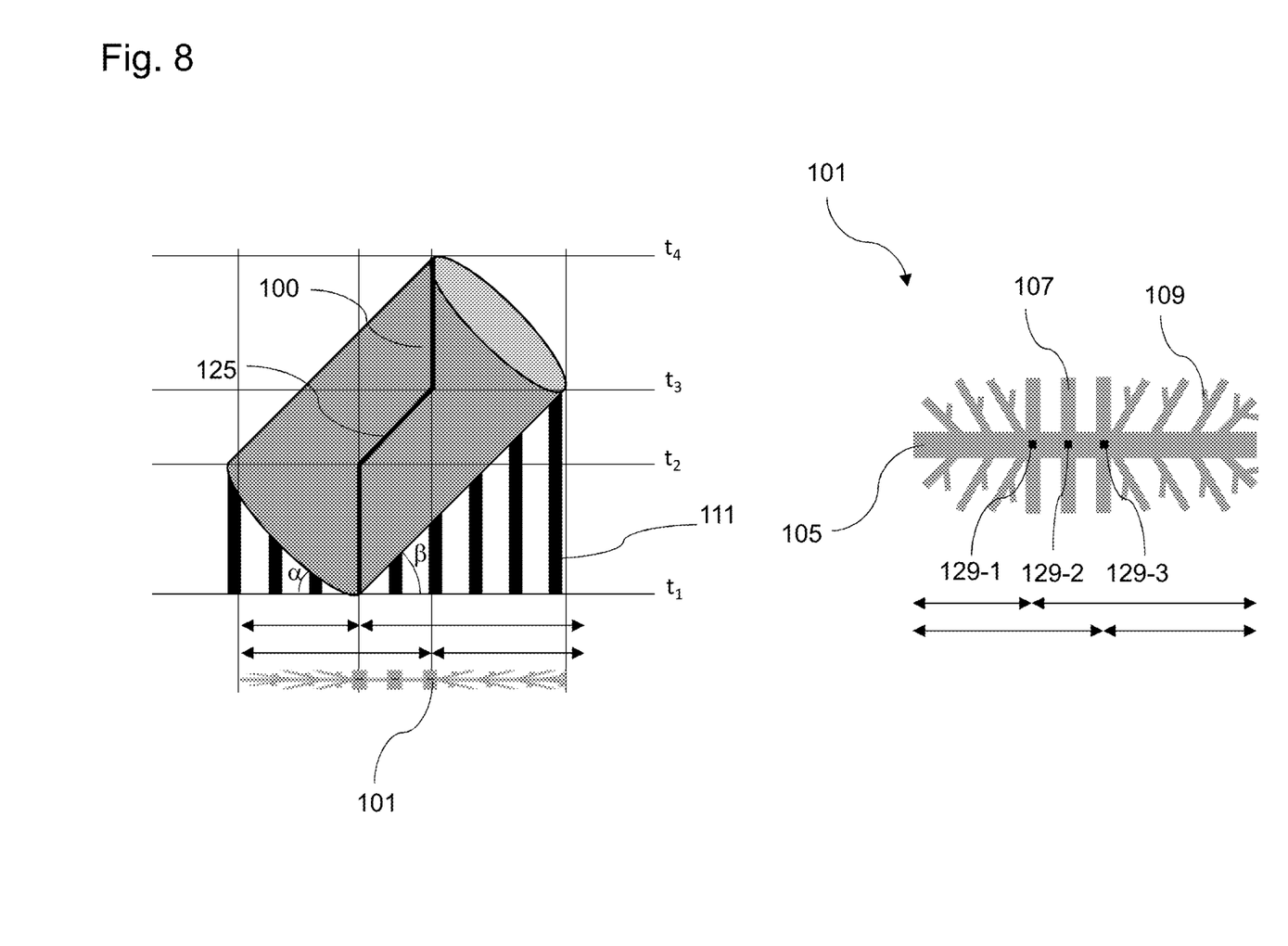
FIG. 8 shows a cylindrical dental object with a dendritic base structure.

FIG. 8 shows a cylindrical dental object 100 with a dendritic base structure 101 in a non-z-symmetric orientation. The angles $\alpha$ and $\beta$ are the local angles of the object surface to the base plane. Line 125 represents the sum of all layer-specific centroids of plane areas. The time points $t_1$, $t_2$, $t_3$ and $t_4$ are successive time points within the layer-by-layer buildup in the construction process. At time $t_1$, $t_2$ point 129-1 is the center of base structure 101, at time $t_2<t<t_3$ point 129-2 is the center of base structure 101, and at time $t_3$, $t_4$ point 129-3 is the center of base structure 101.

The angle of inclination of the axis of rotation of the dental object 100 is 45° to the build platform 103. The angle of inclination of a surface or partial surface in relation to the plane of the build platform 103 determines whether the base structure 101 is self-supporting at the corresponding position or is supported by a support structure 111. For example, if the angle is below a self-supporting angle, support structures 111 are placed and connected to the build platform 103 via the base structure 101.

Layer information is used for additive manufacturing. Each individual layer has a centroid. In the three-dimensional buildup, there is a position of the current centroid at each time t of the build process. The sum of all layer-specific centroids results in a line 125 within the dental object 100.

Depending on the dental object 100, the line 125 of the centroid of the surface may lie within the object, such as in the case of a cylinder. The line 125 may also lie partially outside the dental object 100, such as in the case of a cylindrical ring lying on the build platform 103. However, the line 125 may also lie entirely within the dental object 100, such as in the case of a cylindrical ring resting on the build platform 103.

The base structure 101 comprises at least one main structure 105. Further branches 107 or twigs 109 are generated object-specifically. The main structure 105 comprises a region of the two-dimensional projection of the layer-specific surface center of gravity line onto the plane of the build platform 103. The branches 107 or twigs 109 support the main axes emanating from the base structure 101, considering the requirements for a bonding surface and flow behavior. Preferably, areas of the first or respective first object surfaces, i.e., local minima, are supported.

Figure 9:
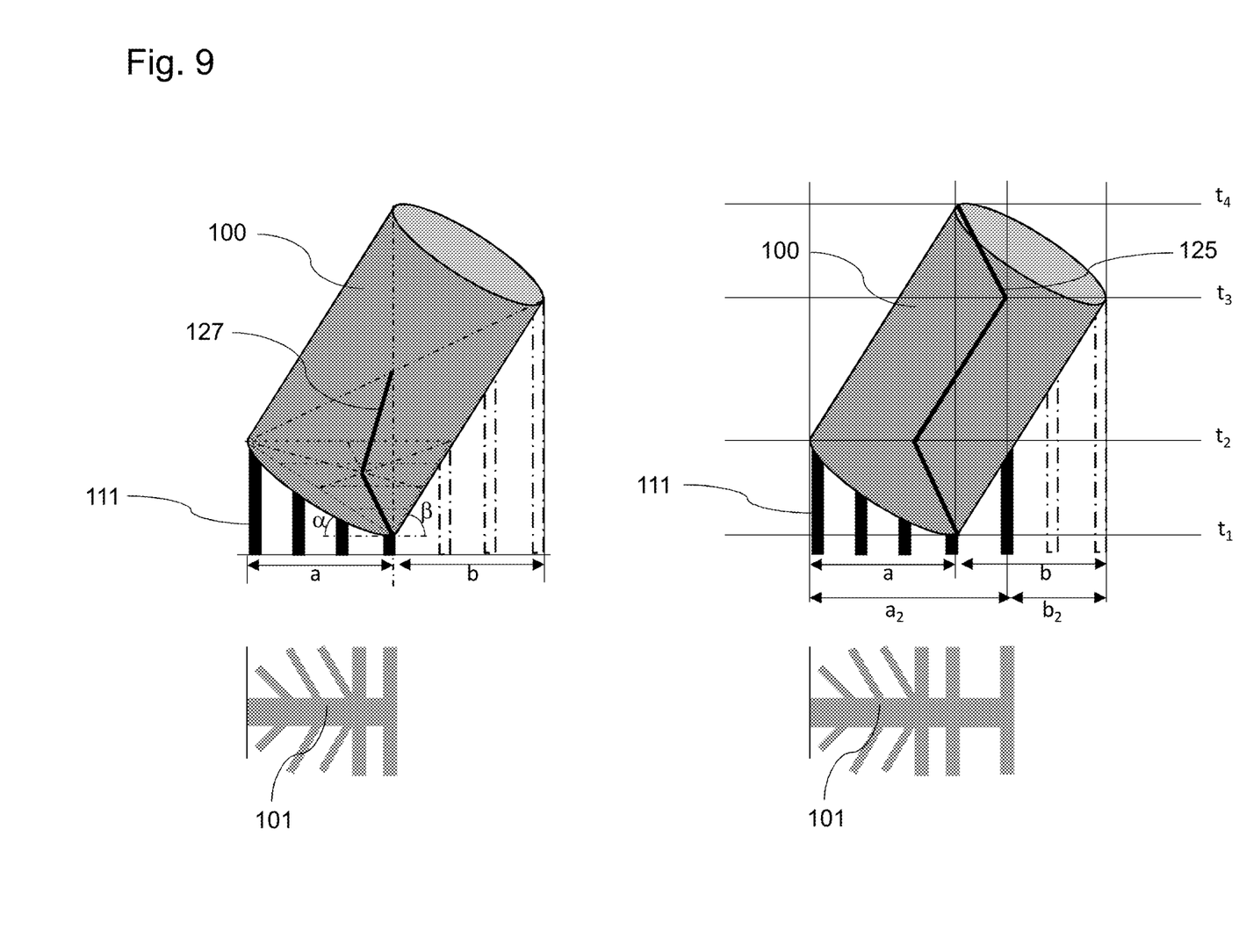
FIG. 9 shows another cylindrical dental object with a dendritic base structure.

FIG. 9 shows a cylindrical dental object with a dendritic base structure 101 with a non-z-symmetric orientation. Line 127 represents the path of the resulting centroid of volume across the layered structure.

The angle of inclination of the rotation axis of the dental object 100 differs from 45° to the build platform 103. The angle $\alpha$ of one side of the dental object 100 is below the self-supporting angle and the angle $\beta$ is above the self-supporting angle. Therefore, support structures 111 are created on the left side, while support structure 111 are not required on the right side. The resulting base structure 101 is oriented along the projection of the line of volume centroids 127.

Similar to the course of the line 125 of all surface centers of gravity, the line 127 of the volume center of gravity can also lie inside or outside the dental object 100. The surface center of gravity can always be inside the dental object 100 and the volume center of gravity can always be outside the dental object 100, for example in the case of a spiral standing on the build platform 103. Any geometry information can be used to generate an optimized base structure 101.

At time $t_3$, the projection of the surface center of gravity may be outside the base structure 101 (FIG. 9—right). The base structure 101 is lengthened by the distance $a_2$–a to reduce the force moment on the adhesive surface caused by the geometry-induced center of gravity displacement.

All features explained and shown in connection with individual embodiments of the invention may be provided in different combinations in the subject-matter of the invention to simultaneously realize their beneficial effects.

All method steps can be implemented by means which are suitable for executing the respective method step. All functions that are executed by objective features can be a method step of a method.

The scope of protection of the present invention is given by the claims and is not limited by the features explained in the description or shown in the figures.

REFERENCE LIST

100 Dental object
101 Dendritic base structure
103 Build platform
105 Main structure
107 Branch
109 Twig
111 Support structure
113 Layers
115 Separation plane
119 Vertical axis
123 Exposure plane
125 Line of centroids
127 Line of volume centroids
129 Point
131 Constriction

The invention claimed is:

1. A manufacturing method for a dental object (100), comprising the steps:
   creating a dendritic base structure (101) on a build platform (103), wherein the dendritic base structure comprises a planar main structure (105) from which extensions (109, 107) extend in an outward direction;
   forming at least one support structure (111) on the dendritic base structure (101), and
   building the dental object (100) on the at least one support structure (101) by a three-dimensional printing process.

2. The manufacturing method according to claim 1, wherein the main structure (105) of the dendritic base structure (101) is located below the geometric center of the dental object (100).

3. The manufacturing method according to claim 1, wherein a twig (109) of the dendritic base structure (101) is formed with a smaller width than a branch (107) of the dendritic base structure (101).

4. The manufacturing method according to claim 1, wherein support structures (111) for the dental object (100) are created on the base structure (101).

5. The manufacturing method according to claim 1, wherein at least one support structure (111) is formed beyond the dendritic base structure (101).

6. The manufacturing method according to claim 1, wherein the dendritic base structure (101) is mirror symmetric, rotationally symmetric or asymmetric.

7. The manufacturing method according to claim 1, wherein a dendritic support structure (111) is built onto the dendritic base structure (101).

8. The manufacturing method according to claim 1, wherein a local width of the dendritic base structure (101) is adapted to the locally occurring forces by the dental object (100).

9. The manufacturing method according to claim 1, wherein the dendritic base structure (101) is built up in layers (113).

10. The manufacturing method according to claim 1, wherein a height of the dendritic base structure (101) increases toward the main structure (105) of the dendritic base structure (101).

11. The manufacturing method according to claim 1, wherein the main structure (105) of the dendritic base structure (101) is arranged below the center of gravity of the dental object (100) to be built up.

12. The manufacturing method according to claim 11, wherein the center of gravity of the dental object (100) is supported by a support structure (111) on the main structure (105) of the dendritic base structure (101).

* * * * *